United States Patent
Noebel et al.

(10) Patent No.: US 8,505,851 B2
(45) Date of Patent: Aug. 13, 2013

(54) PROFILE COMPRISING AT LEAST ONE HOLLOW PROFILE SECTION

(75) Inventors: Torsten Noebel, Hamburg (DE); Arne Paulukuhn, Hamburg (DE)

(73) Assignee: AIRBUS Operations GmbH, Hamburg (DE)

( * ) Notice: Subject to any disclaimer, the term of this patent is extended or adjusted under 35 U.S.C. 154(b) by 747 days.

(21) Appl. No.: 12/669,956

(22) PCT Filed: Jul. 9, 2008

(86) PCT No.: PCT/EP2008/058915
§ 371 (c)(1),
(2), (4) Date: Jan. 20, 2010

(87) PCT Pub. No.: WO2009/013133
PCT Pub. Date: Jan. 29, 2009

(65) Prior Publication Data
US 2010/0181428 A1    Jul. 22, 2010

Related U.S. Application Data

(60) Provisional application No. 60/950,965, filed on Jul. 20, 2007.

(30) Foreign Application Priority Data

Jul. 20, 2007    (DE) .......................... 10 2007 033 868

(51) Int. Cl.
*B64G 1/24*    (2006.01)
*B64C 1/06*    (2006.01)
*E04C 3/07*    (2006.01)

(52) U.S. Cl.
USPC ............. 244/158.1; 244/119; 52/836; 52/846

(58) Field of Classification Search
USPC ................. 244/117 R, 119, 120, 131, 158.1, 244/129.1; 52/342, 461, 468, 837, 843, 846, 52/836
See application file for complete search history.

(56) References Cited

U.S. PATENT DOCUMENTS

| | | | |
|---|---|---|---|
| 304,784 A * | 9/1884 | Butz | 52/843 |
| 2,383,634 A | 8/1945 | Watter | |
| 3,875,721 A * | 4/1975 | Mengeringhausen et al. | 52/846 |
| 4,010,591 A * | 3/1977 | Gross | 52/846 |
| 5,553,437 A * | 9/1996 | Navon | 52/837 |
| 6,554,225 B1 * | 4/2003 | Anast et al. | 244/117 R |
| 7,074,474 B2 * | 7/2006 | Toi et al. | 428/102 |

FOREIGN PATENT DOCUMENTS

| | | |
|---|---|---|
| DE | 298 01 562 U 1 | 8/1999 |
| DE | 694 22 292 T2 | 7/2000 |
| JP | 04 260815 A | 9/1992 |
| JP | 10 058973 A | 3/1998 |

OTHER PUBLICATIONS

PCT International Search Report and Written Opinion, PCT Application No. PCT/EP2008/058915, Feb. 4, 2009, 11 pages.
Chinese First Office Action, Chinese Application No. 200880025509.4, May 3, 2012, 3 pages.
Chinese Second Office Action, Chinese Application No. 200880025509.4, Dec. 31, 2012, 3 pages.

* cited by examiner

*Primary Examiner* — Rob Swiatek
(74) *Attorney, Agent, or Firm* — Fenwick & West LLP

(57) ABSTRACT

A profiled part, for use, in particular, within an aircraft or spacecraft, the profiled part comprising at least one hollow profiled part portion and a T-shaped and/or L-shaped profiled part portion.

17 Claims, 3 Drawing Sheets

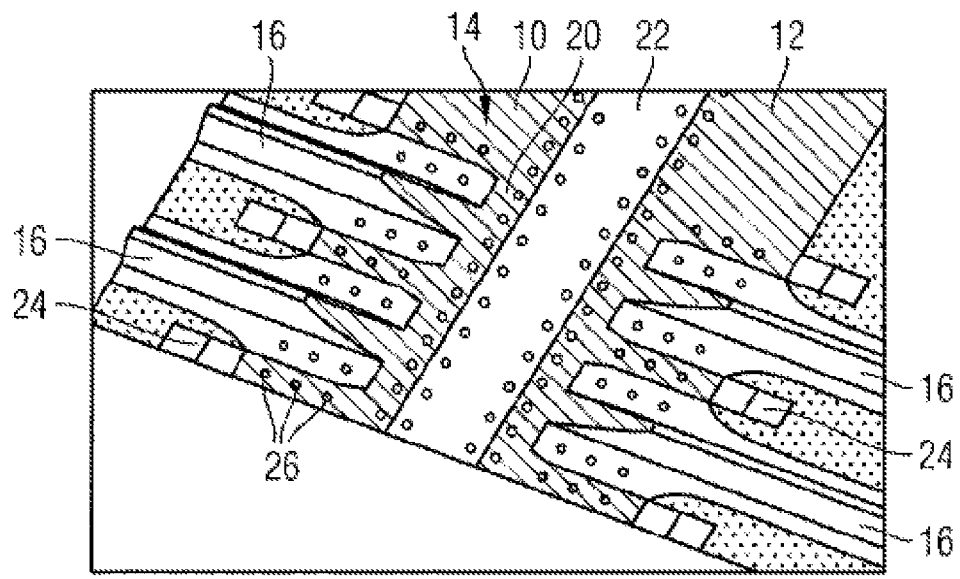
PRIOR ART Fig. 1
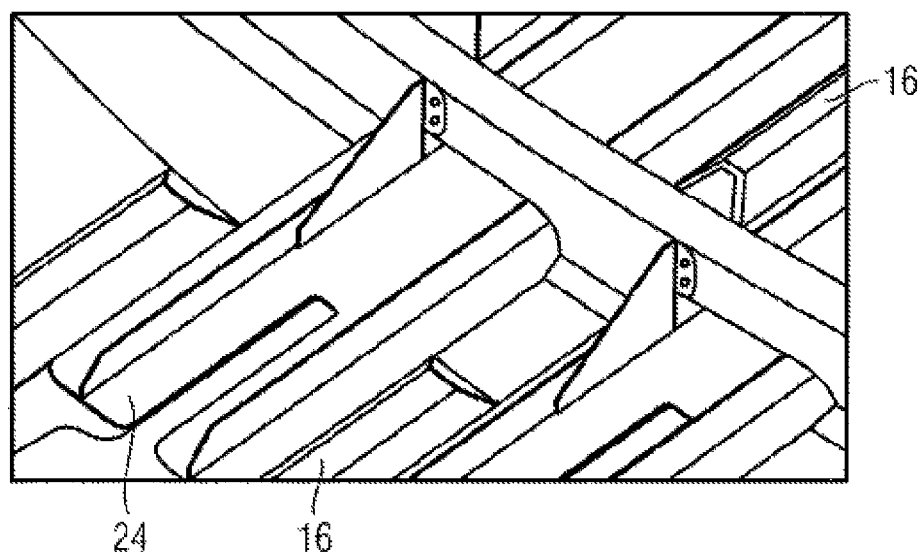
PRIOR ART Fig. 2

PROFILE COMPRISING AT LEAST ONE HOLLOW PROFILE SECTION

CROSS-REFERENCE TO RELATED APPLICATIONS

This application claims the benefit of U.S. Provisional Application No. 60/950,965, filed Jul. 20, 2007 and German Patent Application No. 10 2007 033 868.8, filed Jul. 20, 2007, the entire disclosures of which are herein incorporated by reference.

FIELD OF THE INVENTION

The present invention relates to a profiled part comprising at least one hollow profiled part portion and which may be used for example as a stringer or former, for example within the field of aircraft construction or within the aerospace industry.

Fuselages of modern commercial aircraft basically comprise a fuselage arrangement consisting of an outer skin and structural components. The structural components, for example stringers or formers, are connected to the skin, in particular to lend a high level of stability to the fuselage, and form a supporting construction having transverse and longitudinal reinforcing struts, which supports the outer skin. These units, also known as shells, are connected to form panels or tubular portions and, in a further assembly, together form the pressure fuselage.

It is generally known from the prior art to use so-called omega profiled parts as stringers. These omega profiled parts offer the advantage of exhibiting better structural integrity.

However, a considerable drawback of omega profiled parts is that further components, for example clips and cleats etc., can only be fixed to the omega profiled parts using blind rivets. This means that the rivets can only be accessed from the outside and may be inspected from this position, but not from the inside. This poses a problem in regions which are particularly relevant for safety, such as connections between fuselage panels or the rear pressure bulkhead. In these regions connection by means of blind rivets is usually undesired owing to the restricted conditions for inspecting the rivet connections.

Although they can be applied to any type of fuselage and other components, the present invention and the problem on which it is based are explained in greater detail with reference to a fuselage of a commercial aircraft.

SUMMARY OF THE INVENTION

The object of the present invention is therefore to provide a profiled part comprising at least one hollow profiled part portion and allowing further components to be fixed in at least one portion, it being possible to dispense with a blind rivet fixing.

This object is achieved according to the invention by a profiled part comprising at least one hollow profiled part portion and having the features of claim 1.

Accordingly, a profiled part is provided for use, in particular, within an aircraft or spacecraft, the profiled part comprising at least one hollow profiled part portion and a T-shaped and/or L-shaped profiled part portion.

The idea on which the present invention is based consists, on the one hand, of benefiting from the advantage gained by using a hollow profiled part, in particular an omega profiled part and, on the other hand, of eliminating the drawbacks of said profiled part.

This is achieved in that at least a portion of the profiled part according to the invention is configured as a hollow profiled part, for example as an omega profiled part, and at least a portion of the profiled part is configured as a T-shaped and/or L-shaped profiled part for fixing further components. This T-shaped or L-shaped profiled part offers the advantage that it may be accessed from either side and, for example, other components, such as clips, cleats, stringers, formers etc., may thus be fixed using rivets and/or other fixing means which can be accessed and inspected from either side in such a way that, for example, no blind rivets comprising the aforementioned drawbacks are obtained.

The invention thus makes it possible to use profiled parts comprising at least one hollow profiled part portion, in particular even in those regions which are particularly relevant for safety and in which known hollow profiled parts could not be used previously, or could only be used with considerable limitations.

Further configurations and developments of the invention will emerge from the sub-claims and the description given with reference to the drawings.

In accordance with a development of the invention, the profiled part comprises a transition portion between at least one hollow profiled part portion and a T-shaped and/or L-shaped profiled part portion. This offers the advantage that any loading can be transferred continuously.

In a further configuration according to the invention, the profiled part comprises at least two or more hollow profiled part portions, the hollow profiled part portions possibly having the same cross-sectional shape and/or a different cross-sectional shape. This offers the advantage that the cross-sectional shapes of the hollow profiled part portions can be adapted to the respective function in a specific region where the profiled part according to the invention is arranged, and/or to specific loading.

In another embodiment according to the invention, the profiled part comprises at least two or more T-shaped and/or L-shaped profiled part portions, the T-shaped or L-shaped profiled parts being of identical or different size and/or shape. This has the advantage that the T-shaped or L-shaped profiled parts can be adapted, for example individually, to the parts to which the T-shaped or L-shaped profiled parts are to be connected. The T-shaped or L-shaped profiled part thus does not form a perpendicular wall, but may, for example, also comprise an inclined wall and/or a stepped wall. The base of the T-shaped profiled part may therefore extend to the same distance on either side of the wall or extend to a different distance from the wall in each case. Furthermore, the upright wall of the T-shaped or L-shaped profiled part may also be provided on one or both sides with a type of roof.

In a further embodiment according to the invention, the T-shaped or L-shaped profiled part portions are connected to another component, such as a clip, a cleat or another T-shaped or L-shaped profiled part portion, for example via rivets, screws and/or bolts. In this case, standard rivets or even high-strength rivets may be used. A further advantage is that all conventional fixing options may be used since the T-shaped or L-shaped profiled portion is easily accessible from either side.

In a further embodiment according to the invention, the profiled part is configured as a stringer and/or former. This has the advantage that, for example, stringers which are used with different fuselage panel portions can be interconnected very easily, for example via what is known as a stringer coupling. The previous, very complicated method for connecting fuselage panel portions, with which conventional hollow profiled parts are used as stringers, is thus abandoned.

In accordance with a further embodiment according to the invention, the profiled part comprises at least one or more composite materials. Examples of these composite materials include, inter alia, GLARE, HSS-GLARE, CFRP, GFRP and/or AFC. However, the invention is not limited to these composite materials but includes any composite material which can be used within the fields of aviation and aerospace.

In another embodiment according to the invention, the profiled part according to the invention comprises metal or a metal alloy, for example an aluminium, steel and/or titanium alloy. The profiled part may also consist of a combination of at least one or more of the aforementioned composite materials and at least one or more metals or metal alloys.

In accordance with a further embodiment according to the invention, the profiled part according to the invention is produced by a hot moulding method, at least in part or else completely. The method has the advantage that a profiled part can thus be produced in a simple and cost-effective manner, in particular even with a complicated shape.

The invention will be described in greater detail hereinafter by means of embodiments and with reference to the accompanying figures shown in the drawings, in which:

BRIEF DESCRIPTION OF THE DRAWINGS

FIG. 1 is a perspective view of a connection between two panel portions, omega profiled parts being used as stringers in accordance with the prior art;

FIG. 2 shows an enlarged detail of the view according to FIG. 1;

DESCRIPTION OF EXEMPLARY EMBODIMENTS

Figure 3:
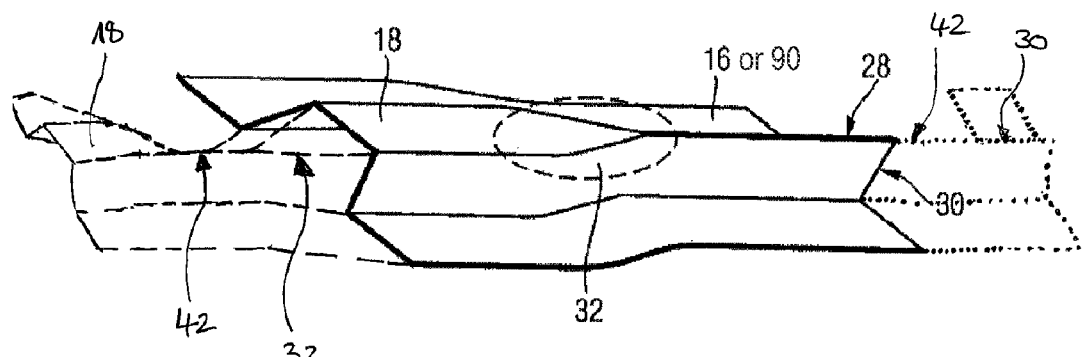
FIG. 3 is a perspective view of an embodiment of the profiled part comprising a hollow profiled part portion according to the invention.

In the figures, like reference numerals denote like or functionally similar components, unless otherwise indicated.

FIG. 1 is a perspective detailed view of a connection between two fuselage panels 10, 12. The fuselages of commercial aircraft generally consist of supporting constructions having transverse and longitudinal reinforcing struts, for example consisting of a combination of stringers and formers, which support the outer skin. These units, also known as shells, are connected to form panels, such as tubular portions and, in a further assembly, together form the pressure fuselage.

An outer skin component 14 is thus reinforced in the longitudinal direction via stringers 16. The stringers 16 are configured as omega hollow profiled parts 18 in this case. As already described, however, this presents the drawback that the respective stringers 16 of the fuselage panels 10, 12 cannot be directly interconnected, for example using rivets, since so-called blind rivets would be produced. These blind rivets would, in this case, only be accessible from the outer face of the stringers 16 but not from the inner face. The stringers 16 thus finish at the ends 20 of the fuselage panel 10, 12.

An at least partially or completely peripheral strip 22 is thus used to fix the two fuselage panels 10, 12 and can be riveted, for example, to the two fuselage panels 10, 12. Furthermore, strip portions 24 are arranged between the stringers 16, said portions being fixed, for example, using rivets 26.

However, this has the drawback of being associated with considerable additional production and assembly costs. In addition, the structure of the stringers 16 in this region may not be used to provide transverse reinforcement, since it is not possible to connect the stringers 16 of the fuselage panels 10, 12 via what is known as a stringer coupling owing to the blind rivet connection thus produced. Continuous load transfer cannot be obtained in this way.

FIG. 2 further shows an enlarged detail of the connection between the two fuselage panels 10, 12 according to FIG. 1. On the one hand, the stringers 16 are shown and, on the other hand, the strip portions 24 arranged between the stringers 16 are shown and interconnect the two fuselage panels 10, 12.

FIG. 3 is a perspective view of a first embodiment of the profiled part 28 according to the invention. The profiled part 28 comprises a portion having a hollow profiled part 18. This hollow profiled part portion 18 is thus configured as an omega profiled part. However, in principle the hollow profiled part 18 may comprise any other cross-section, depending on its function and purpose. The present invention is not limited to an omega cross-section and the cross-section of the hollow profiled part 18 may be varied as desired depending on its function and purpose.

The profiled part 28 according to the invention is assembled together with the hollow profiled part cross-section 18 to form a T-shaped profiled part portion 30. The T-shaped profiled part portion 30 thus offers the advantage that further components, for example clips, cleats and other structural components, such as stringers 16 and formers etc., can be fixed to it. The profiled part 28 according to the invention may thus be configured, for example, as a stringer 16 and/or a former 90.

Another considerable advantage of the invention is that, in contrast to the prior art, the stringers 16 of opposing fuselage panels 10, 12 for example can very easily be interconnected. The stringers 16 according to the invention thus comprise, for example, at least one hollow profiled part portion 18, such as an omega hollow profiled part, and a T-shaped profiled part portion 30 at least one or both ends. A second transition portion 32, an L-shaped profiled part portion 42 and a second hollow profiled part portion 18 is shown in FIG. 3 with dashed lines and a second L-shaped profiled part potion 42 and second T-shaped profiled part portion 30 is shown in FIG. 3 with lines.

The T-shaped profiled part portions 30 of the opposing stringers 16 of the respective fuselage panels 10, 12 may, for example, be interconnected very easily using what is known as a stringer coupling (not shown), for example by means of a rivet connection. In contrast to the prior art, there are thus no blind rivet connections, only rivet connections which can be accessed and inspected from either side. This offers the further advantage that complex and expensive connections between the fuselage panels 10, 12 can be dispensed with, as was previously the case with conventional hollow profiled part stringers 16.

Furthermore, high-strength rivets may be used with the profiled part 28 according to the invention. In addition, simpler assembly may also be achieved with the profiled part 28 according to the invention. Better transfer of loading may also be achieved, since different fuselage panels 10, 12 for example or a pressure bulkhead for example can be interconnected using the aforementioned stringer coupling.

The transition between the respective hollow profiled part portion 18 and the T-shaped profiled part portion 30 may thus be continuous, as is shown for example in FIG. 3. Of course, it is also conceivable, depending on function or purpose, for the transition to extend directly from the hollow profiled part 18 to the T-shaped profiled part 30 (not shown), without having a transition portion 32 in which the hollow profiled part 18 merges slowly into the T-shaped profiled part 30.

Furthermore, the profiled part 28 according to the invention may also be configured alternately with T-shaped profiled part portions 30 and hollow profiled part portions 18. The transition portion 32 can thus be arranged alternately between the T-shaped profiled part portions 30 and hollow profiled part portion 18, as described below with reference to FIG. 3.

The hollow profiled part portions 18 may thus have the same cross-sectional shape, for example an omega profiled part, as shown in FIGS. 1 and 3, or may even have different hollow profiled parts 18 depending on function and purpose. For example, the formers may thus be fixed very easily via clips or cleats to T-shaped profiled part portions of stringers 16 according to the invention.

Figure 4:
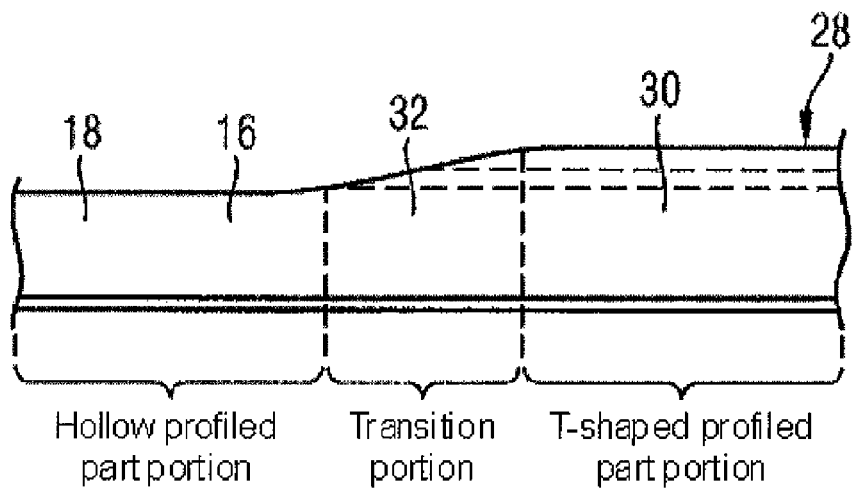
FIG. 4 is a side view of the profiled part according to FIG. 3.

FIG. 4 shows a side view of the first embodiment of the profiled part 28 according to the invention. The first portion of the profiled part 28 according to the invention forms the hollow profiled part 18 in the form of an omega profiled part. A subsequent portion forms a transition portion 32 from the hollow profiled part portion 18 into a T-shaped profiled part portion 30. During production, for example using a composite material such as Glass Fiber Reinforced Polymer (GFRP), a projecting portion of the transition portion 32 and of the T-shaped profiled part portion 30, indicated by a dashed line, can later be milled, for example so as to make uniform the height of the profiled part 28 according to the invention. However, this is not strictly necessary and is dependent on the function or purpose of the profiled part 28 according to the invention.

The profiled part 28 according to the invention may, for example, be produced from a composite material, for example Carbon-Fiber Reinforced Polymer (CFRP), Glass Fiber Reinforced Polymer (GFRP),Glass Laminate Aluminum Reinforced Epoxy (GLARE), High static Strength Glass Laminate Aluminum Reinforced Epoxy (HSS-GLARE) and/ or Active Fiber Composite (AFC), to name only a few examples of composite materials.

Furthermore, it is also conceivable for the profiled part 28 according to the invention to be produced from metal or a metal alloy, or from a combination of at least one composite material and at least one metal or metal alloy. What is known as a hot moulding method or RTM (resin transfer moulding) method can be used as a production method, if for example composite materials are to be used. In addition, when using metal sheets these may be correspondingly bent or deformed for example, additional layers of composite material(s) optionally being provided. For example, metals or metal alloys and composite materials may be combined in such a way that corrosion can be largely prevented.

The invention has been described in FIGS. 3 and 4 with reference to a T-shaped profiled part 30. However, these embodiments also apply to an L-shaped profiled part 42. Furthermore, it is also possible to combine T-shaped and L-shaped profiled parts. Profiled parts according to the invention are thus conceivable in which the hollow profiled part portions 18 merge, for example, into T-shaped profiled parts 30 or L-shaped profiled parts 42, transition portions 32 optionally being provided in each case between the hollow profiled parts 18 and T-shaped or L-shaped profiled parts 30, 42.

Figure 5A:
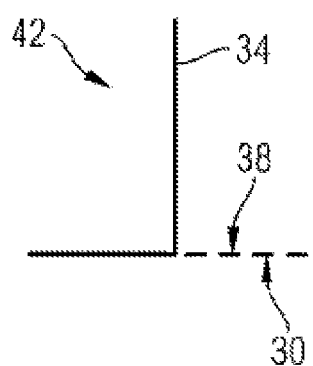
FIG. 5a-c are sectional views of exemplary embodiments of the T-shaped or L-shaped profiled part.
Figure 5B:
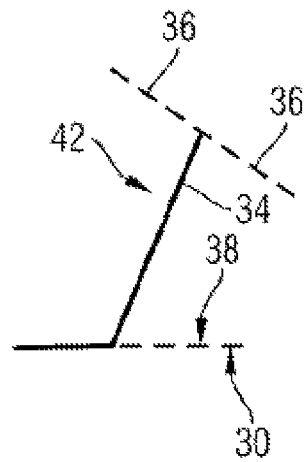
Figure 5C:
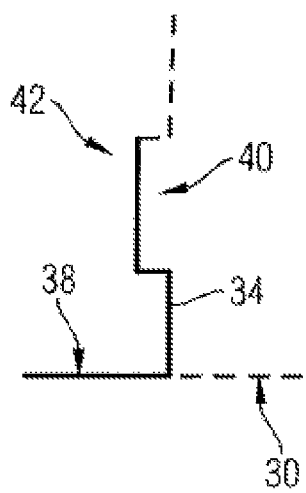

FIG. 5a-c show different examples of how the T-shaped profiled portion or L-shaped profiled part portion 30, 42 can be configured. However, the present invention is not limited to these examples. It is obvious to the average person skilled in the art that there are many options for correspondingly configuring the T-shaped profiled part 30 or L-shaped profiled part 42.

FIG. 5a is a sectional view of a T-shaped or L-shaped profiled part portion 30, 42 according to the invention. The T-shaped profiled part portion 30 is indicated by a respective dashed line since the T-shaped profiled part portion 30 comprises a base 38 which extends on either side of a wall 34, whilst the base 38 of the L-shaped profiled part portion 42 only extends on one side of the wall 34. In principle however, it is also possible for the base 38 to be removed completely in the case of the T-shaped and L-shaped profiled part, leaving only the wall 34.

In the case of the T-shaped or L-shaped profiled part portion 30 in FIG. 5a, the wall 34 is thus configured, for example, substantially perpendicular to the base 38.

Furthermore, in FIG. 5b the wall 34 is inclined relative to the base 38. In this case, the wall 34 of the T-shaped or L-shaped profiled part portion 30, 42 may optionally also be provided with a type of roof 36 on one or both sides, as is shown in FIG. 5b by a dashed line.

In a further example of a T-shaped or L-shaped profiled part 30, 42, as shown in FIG. 5c, the wall 34 may be stepped. Alternatively, the wall 34, as shown by a dashed line, may also be configured with at least one recess 40 or groove.

Although the present invention has been described here with reference to preferred embodiments, it is not restricted thereto and may be modified in many different ways.

List Of Reference Numerals
10 fuselage panel
12 fuselage panel
14 outer skin component
16 stringer
18 hollow profiled part
20 end of the fuselage panel
22 strip
24 strip portion
26 rivet
28 profiled part
30 T-shaped profiled part
32 transition portion
34 wall
36 roof
38 base
40 recess
42 L-shaped profiled part

The invention claimed is:

1. A profiled part, for use within an aircraft or spacecraft, wherein a cross-section of the profiled part varies along its length, and wherein the profiled part comprises at least one hollow profiled part cross-section portion and at least one of a T-shaped or L-shaped profiled part cross-section portion.

2. The profiled part according to claim 1, wherein the profiled part comprises a transition cross-section portion between the at least one hollow profiled part cross-section portion and the at least one of the T-shaped or L-shaped profiled part cross-section portion.

3. The profiled part according to claim 1, wherein the profiled part comprises at least two hollow profiled part cross-section portions, the hollow profiled part cross-section portions having same cross-sectional shapes or different cross-sectional shapes.

4. The profiled part according to claim 1, wherein the profiled part comprises at least two or more T-shaped or L-shaped profiled part cross-section portions.

5. The profiled part according to claim 4, wherein the at least two T-shaped profiled part cross-sections are of identical or of different size or shape.

6. The profiled part according to claim 4, wherein the at least two L-shaped profiled part cross-sections are of identical or of different size or shape.

7. The profiled part according to claim 1, wherein the profiled part comprises at least two or more transition cross-section portions, the transition cross-section portions in each case being identical or different from one another.

8. The profiled part according to claim 1, wherein the T-shaped or L-shaped profiled part cross-section portion is configured for connection to another component using at least one of rivets, screws or bolts.

9. The profiled part according to claim 8, wherein the T-shaped or L-shaped profiled part cross-section portion can be connected to another component, wherein the another component is at least one of a clip, a cleat, another T-shaped profiled part cross-section portion or another L-shaped profiled part cross-section portion.

10. The profiled part according to claim 9, wherein the another T-shaped or L-shaped profiled part cross-section portion is a stringer or a former.

11. The profiled part according to claim 1, wherein the profiled part is configured as at least one of a stringer or a former.

12. The profiled part according to claim 1, wherein the profiled part comprises at least one or more composite materials, the composite materials including at least one of, glass laminate aluminum reinforced epoxy, high static strength glass laminate aluminum reinforced epoxy, carbon-fiber reinforced polymer, glass fiber reinforced polymer or active fiber composite.

13. The profiled part according to claim 1, wherein the profiled part comprises metal or a metal alloy.

14. The profiled part according to claim 13, wherein the profiled part comprises an aluminium or titanium alloy.

15. The profiled part according to claim 1, wherein the profiled part is produced by a hot moulding method.

16. The profiled part according to claim 1, wherein at least one of the T-shaped or L-shaped profiled part cross-section portion is configured so as to be taller than, the same height as or shorter than the hollow profiled part cross-section portion.

17. A commercial aircraft comprising at least one profiled part according to claim 1.

* * * * *